S. WENZEL.
HOG BEATER BELT.
APPLICATION FILED OCT. 19, 1915.

1,213,717.  Patented Jan. 23, 1917.

WITNESSES
George Du Bon

INVENTOR
STEPHEN WENZEL
BY
ATTORNEYS

UNITED STATES PATENT OFFICE.

STEPHEN WENZEL, OF JERSEY CITY, NEW JERSEY, ASSIGNOR TO NEW JERSEY CAR SPRING & RUBBER CO., OF JERSEY CITY, NEW JERSEY, A CORPORATION OF NEW JERSEY.

HOG-BEATER BELT.

1,213,717.

Specification of Letters Patent. Patented Jan. 23, 1917.

Application filed October 19, 1915. Serial No. 56,717.

*To all whom it may concern:*

Be it known that I, STEPHEN WENZEL, a citizen of the United States, and resident of Jersey City, county of Hudson, State of New Jersey, have invented certain new and useful Improvements in Hog-Beater Belts, of which the following is a specification.

My invention relates more particularly to belting adapted to form the beater arms in a hog scraping machine, the beater arms being adapted to remove the bristles from the skin of the hog. The operation of this type of machine is well known in the art and need not be described here.

The object of my invention is to improve the beater arm by improving the construction of the belt used therefor.

It will be understood that the beater arms are secured to a revolving shaft and by striking the carcass are adapted to loosen and remove the bristles. This continued action with the ordinary belting used for the beater arms soon renders the arms too flabby or inelastic at the points of attachment and hence the efficiency of the beating or scraping action is reduced. In my improvement I reinforce the ends of the belt in such a way as to increase the life of the belt and prolong the period of elastic usefulness of the beater arms in the operation of the machine. I accomplish this preferably by building into the ends of the belt additional layers of canvas, the successive layers overlapping in shorter and shorter lengths toward the ends so that the thicker ends taper toward the middle portion of the belt which is of the normal uniform thickness. The reinforcement of the belt ends in this manner may be made either on both sides of each end of the belt; on one side or on opposite sides, or in any other suitable way. Belts of this character are usually made of a plurality of layers of canvas laid in rubber and vulcanized to form an integral structure, the surface of the belt preferably being formed by wrapping the belt with a specially prepared canvas strip, giving it what is called a friction surface.

In the accompanying drawings I have illustrated a few forms of my improved belt of which—

Figure 1:
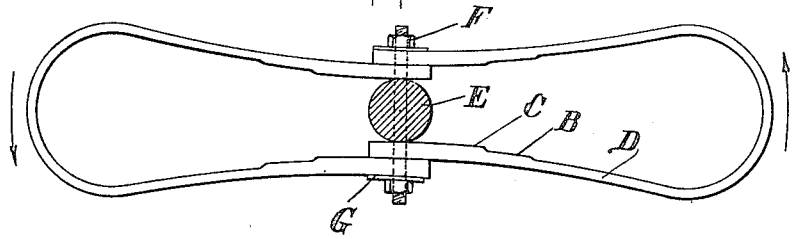
Figure 2:
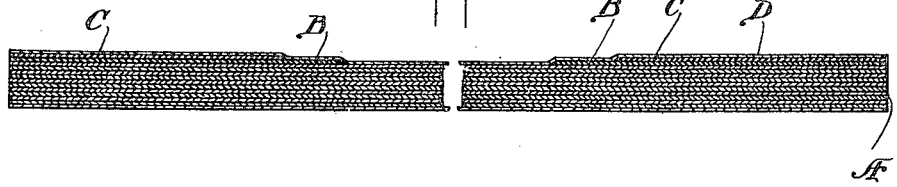
Figure 3:
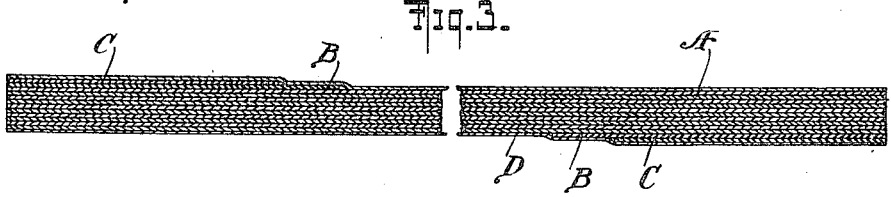
Figure 4:
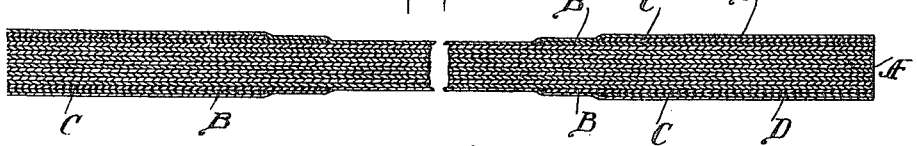
Figure 5:
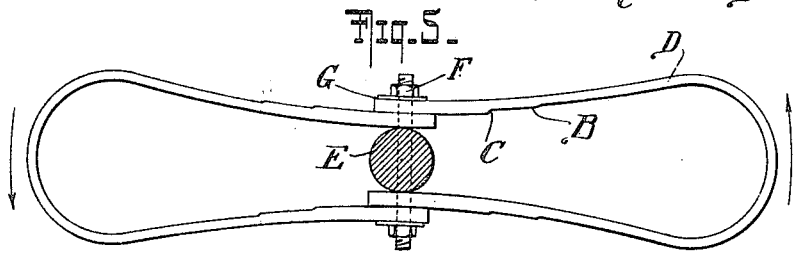

Figure 1 shows one form of belt secured to a shaft substantially in the form of the hog-beater arms; Fig. 2 represents a longitudinal section (enlarged) of one of the belts shown in Fig. 1 of the drawing; Fig. 3 represents another form in which the thickening layers are on opposite sides of the two ends of the belt; Fig. 4 is another form in which the ends are thickened by additional layers on both sides of each end of the belt; Fig. 5 is a view of the belt represented in Fig. 3 secured to the shaft in the form of the hog-beater arms, and Fig. 6 represents the thickening layers at the middle of the belt ends.

Referring to the drawings A represents a plurality of canvas layers embedded in and secured together by layers of rubber, the whole being vulcanized as hereinafter described. In the form shown in Figs. 1 and 2 of the drawings the ends of the belt are reinforced or thickened by the addition of two or more layers of canvas B and C extending from the ends of the belt toward the center for a short distance. The reinforcing strip B preferably extends an inch or so beyond the layer C, thus increasing the resilient action of the layers. The whole belt, including the reinforcing end strips is then covered by wrapping thereabout a strip or layer of canvas D and vulcanizing the entire belt so as to form an integral structure. The outer covering of the belt is preferably specially treated in any well known manner to produce what is known in the trade as a friction cover. When the form of belt shown in Fig. 2 is used in the hog-beater machine it is bent upon itself substantially in the form shown in Fig. 1 of the drawing and secured to a shaft E in any suitable manner as by bolts F and clamping plates G substantially as shown. This reinforcement or thickening of the ends of the belt tends to increase the elasticity of the beater arm and prevent it from breaking down at the edges of the clamps G as soon as would be the case without this reinforcement. The laminated integral structure of the belt ends increases the elasticity of the attached ends of the beater belt and thereby increases the life and efficiency of the beater arms.

It will be understood that ordinarily the beater arms are rotated when in use in one direction only and therefore, the tendency for the arms to wear is confined to one side only of the belt. With this in view it may be desirable to reinforce the ends of the belt in the manner shown in Figs. 3 and 5 of the drawings in which the belt ends are thickened by adding strips on one side only, the strips being on opposite sides at each end of the belt. In this construction the belt when attached as beater arms would appear as shown in Fig. 5 of the drawing and the arms would be rotated in the direction indicated by the arrows. It will be seen that when this is the case the reinforcement will act to prevent the belt breaking down and will add to its elasticity just as the leaves do in a carriage spring or the like. For some classes of work a further reinforcement or thickening of the ends may be desirable in which case the strips reinforcing the ends may be placed on both sides at each end of the belt as shown in Fig. 4 of the drawing.

Figure 6:
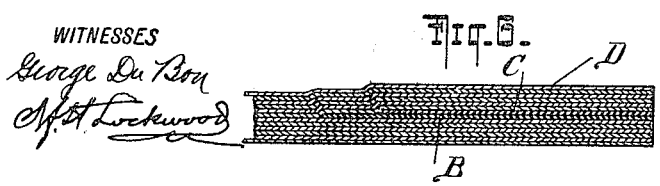

The thickening or reinforcing strips at the belt ends may be placed in the middle, between the several layers making up the belt, when so desired, substantially as shown in Fig. 6 of the drawing.

In all of the forms shown the thickened ends and in fact the entire belt is covered by the canvas friction covering above referred to and vulcanized to form an integral structure which may be bent upon itself and secured in the machine to form the hogbeater arms substantially as described.

One advantage of my improvement is that with my reinforcing strips in the ends of the belt I obtain added resiliency without requiring that the vulcanization shall be carried as far as has been the practice heretofore. By this means I increase the life of the belt and obtain better resiliency over the old type.

Various modifications in the specific details of construction and the application of the reinforcing strips may be made without departing from the spirit and scope of the invention.

I claim:

1. A hogbeater arm comprising a one piece strip of flexible material adapted for use in the form of a loop, said belt being thicker at the ends of the loop than in the middle whereby motion communicated to the thicker portion is internally resisted.

2. A hogbeater arm adapted for use in the form of a loop, said loop comprising a one piece strip of flexible belting, the material thereof being thicker at the ends of the loop and thinner in that portion of the belt intermediate to said ends, the material tapering gradually from the thicker to the thinner portions of the belt whereby motion communicated to the thicker portion is internally resisted.

3. A hogbeater arm comprising a flexible loop made up of a plurality of layers of material, the ends of the loop having more layers than its middle portion, said layers being united to form an integral structure whereby motion communicated to the thicker portion is internally resisted.

4. A belt for hogbeater arms adapted for use in the form of a loop, said belt comprising a plurality of layers of canvas united by rubber or the like to form an integral structure, the ends of the loop being made thicker than its middle portion.

5. A belt for hogbeater arms comprising a plurality of layers of canvas, the number of layers being increasingly greater toward the ends of the belt, a canvas friction cover inclosing all of said layers, said layers and the cover being united by rubber or the like to form an integral structure.

6. A hogbeater arm comprising outer strips of flexible material inclosing a plurality of layers of flexible material throughout the body thereof and additional layers of such material at the ends thereof.

7. A hogbeater arm comprising outer strips of flexible material inclosing a plurality of flexible layers, the end at which said belt is attached to the beating machine having in its interior more of said flexible layers than the middle.

8. A hogbeater arm comprising a flexible loop made up of outer strips of flexible material inclosing a plurality of layers of flexible material, the ends of the loop having more layers than its middle portion, said layers being united to form an integral structure.

9. A hogbeater comprising a single piece looped belt member having outside layers of flexible material, the said outside layers inclosing a plurality of inner flexible layers, the ends of the loop having more layers than the middle, the additional layers being arranged to produce a change in the position of the neutral axis of the built-up multi-ply member.

10. A hogbeater comprising looped belts, each having outside layers of flexible material, the said outside layers inclosing a plurality of flexible elements, the ends of the loop having more such elements than the middle.

In testimony whereof I have hereunto set my hand.

STEPHEN WENZEL.

Copies of this patent may be obtained for five cents each, by addressing the "Commissioner of Patents, Washington, D C."